July 23, 1968  G. L. CLARK  3,393,956

UNIFORM-FIELD KERR CELL

Filed April 1, 1965  2 Sheets-Sheet 1

INVENTOR
GEORGE L. CLARK
BY Allen E. Botney
ATTORNEY

July 23, 1968   G. L. CLARK   3,393,956
UNIFORM-FIELD KERR CELL
Filed April 1, 1965   2 Sheets-Sheet 2

INVENTOR
GEORGE L. CLARK
BY
ATTORNEY

3,393,956
UNIFORM-FIELD KERR CELL
George L. Clark, Sierra Madre, Calif., assignor to Electro-Optical Systems, Inc., Pasadena, Calif., a corporation of California
Filed Apr. 1, 1965, Ser. No. 444,621
6 Claims. (Cl. 350—150)

The present invention relates, in general, to those electro-optical devices known as Kerr cells, and more particularly relates to a new and improved Kerr cell construction that permits uniform electric fields to be applied to the Kerr cell fluid.

Basically speaking, the Kerr cell is composed of two flate plates or electrodes immersed in a fluid which becomes birefringent upon the application of an electric field. When such a cell is oriented between two polarizers crossed for minimum transmission, the arrangement constitutes an optical shutter. With no voltage applied to the cell, light cannot be transmitted because of the crossed polarizers. A voltage applied to the electrodes has the effect of altering the state of polarization of the light, and transmission through the second polarizer is thereby accomplished.

For a clearer picture of the influence of an electric field upon a liquid which exhibits the Kerr effect, consider that a beam of light, plane polarized at an angle $\psi$ with respect to the applied electric field, enters the cell. The electric vector in the incident light may be resolved into two components, one parallel and the other perpendicular to the applied electric field. These components traverse the cell fluid with different velocities and, as a result, possess different wave lengths. As a consequence, if the applied electric field is kept fixed or constant, the two components will differ more and more in space phase as they proceed through the liquid. This is the equivalent of stating that there will be a continuously increasing difference in time phase between the two components of light as they traverse the cell. Since the state of polarization of the light at any point is dependent upon a difference in time phase between the two components, the resultant light emerging from the cell will, in general, no longer be plane polarized. Thus, by way of example, if the angle $\psi$ of the plane of polarization upon entering is 45°, and the angular time phase difference between the components, $\delta$, is an odd multiple of $\pi/2$, the light will become circularly polarized. If $\delta$, on the other hand, is an odd multiple of $\pi$, the emergent light will be plane polarized at 90° to the plane of polarization of the entering light. For $\delta$ equal to an even multiple of $\pi$, the light leaves polarized as it entered. For all other values of $\delta$, the light will be elliptically polarized as it leaves the cell.

Kerr cells have many applications which require that the electro-optic retardation be uniform across the aperture of the cell and accurately predictable when the applied voltage is known. Presently available cells do not provide this uniformity and predictability for two reasons:

(1) Kerr-cell liquids have not been highly enough purified that the fields are not distorted by ions and by convection currents; and (2) Present Kerr cells do not provide uniform electric fields for the reason that the light beam passes through fringing fields before and after it traverses the region between the plates, and the field between the plates is non-uniform is every direction.

One could try to obtain uniformity by increasing the size of the electrodes and using the center portion thereof, but the capacitance of such a cell would be much greater than is desirable and the light path would still pass through fringing fields at both ends of the cell.

The construction of a Kerr cell is not a straight-forward task. The most commonly used Kerr liquids are excellent solvents, and become rapidly contaminated when placed in contact with most materials, especially glues and cements. Kerr liquids tend to be highly toxic, so no leakage of the cell can be tolerated. The optical windows must be flat and strain-free, and must remain so as the temperature changes or voltage is applied to the cell. Kerr cells normally operate at several tens of kilovolts, thereby requiring careful high-voltage design. The combination of these restrictions usually results in a compromise in which field uniformity is sacrificed, thereby leading to the above-mentioned problem. Accordingly, there has been a long-felt need for a Kerr-cell apparatus in which a uniform electric field could be established and maintained.

It is, therefore, an object of the present invention to provide uniform electric fields in a Kerr cell.

It is another object of the present invention to provide a Kerr cell in which the fringing of the electric field is reduced to substantially zero.

The present invention satisfies this long-felt need and fulfills the above-stated objects by increasing the size of the electrodes and by confining the active part of the Kerr cell to the center region between the electrodes. By so restricting the Kerr liquid and by surrounding this active part of the Kerr cell with another liquid having a low dielectric constant, the capacitance of the cell is thereby minimized. More particularly, in accordance with one embodiment of the invention, the cell is composed of three subassemblies, namely, a center subassembly that contains the Kerr liquid, the optical windows, and the electrodes, and two side subassemblies that provide extensions of the electrodes to prevent fringing of the electric field. In use, the three subassemblies are held together in a simple frame. The two side subassemblies may consist of brass electrodes embedded in methyl methacrylate, or another suitable plastic. The center subassembly, on the other hand, may consist of two gold-plated quartz electrodes and two optically flat quartz windows cemented between two thin sheets of quartz to form the container for the Kerr liquid. It will be recognized that since all of the components are quartz, thermal expansion does not produce strains in the windows. Some strains due to electro-striction can be expected in the windows, but their thickness is small compared to the length of the optical path in the Kerr liquid so that the birefringence resulting therefrom should be negligible. The cell itself is filled through a hole in one of the electrodes and is sealed off with a bellows or diaphragm to take up liquid expansion. As previously mentioned, the capacitance of the cell is minimized by restricting the Kerr liquid, which has a high dielectric constant, to the active part of the Kerr cell. In order to prevent electrical breakdown between the electrodes on the outside of the windows, that space therebetween is filled with another transparent liquid having a high dielectric strength, low dielectric constant, and low Kerr constant. This outside chamber is closed by quartz walls and is sealed by a second bellows.

In a second embodiment of the invention, most of the parts of a standard Kerr cell are employed, except that the Kerr liquid is confined by an inner cell between the electrodes. As in the first embodiment, the volume between the inner cell and the outer chamber is filled with a liquid having a low Kerr constant, high transparency, and high dielectric strength. The Kerr liquid is admitted through a hole in one electrode support column, and is sealed off by a flexible diaphragm covering the end of the corresponding hollow terminal. The surrounding liquid is put in through the other electrode support column, and is sealed off by another diaphragm on the other terminal.

The novel features which are believed to be characteristic of the invention, both as to its organization and method of operation, together with further objects and advantages thereof, will be better understood from the following description considered in connection with the accompanying drawings in which a couple of embodiments of the invention are illustrated by way of example. It is to be expressly understood, however, that the drawings are for the purpose of illustration and description only, and are not intended as a definition of the limits of the invention.

Figures 3A, 3B:
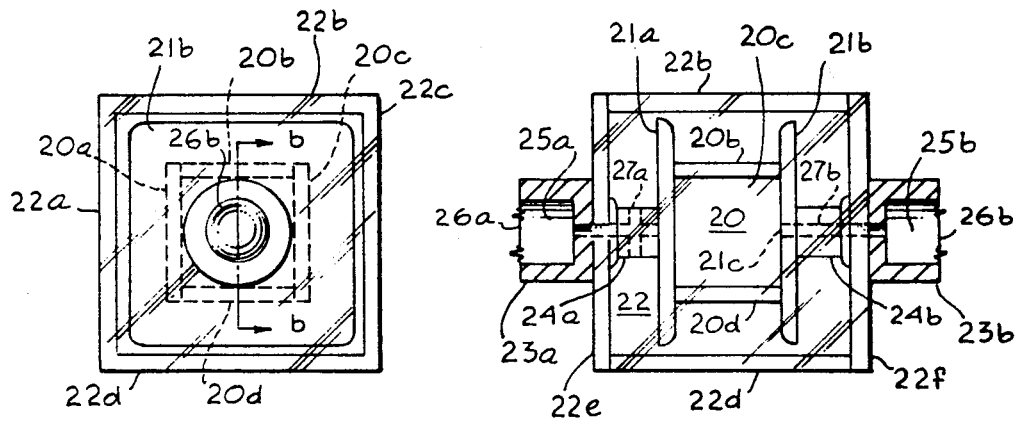

FIG. 3a provides an end view of a second embodiment of the present invention; and FIG. 3b is a cross-sectional front view of the FIG. 3a device taken along the line B—B in the direction of the arrows.

Figure 1:
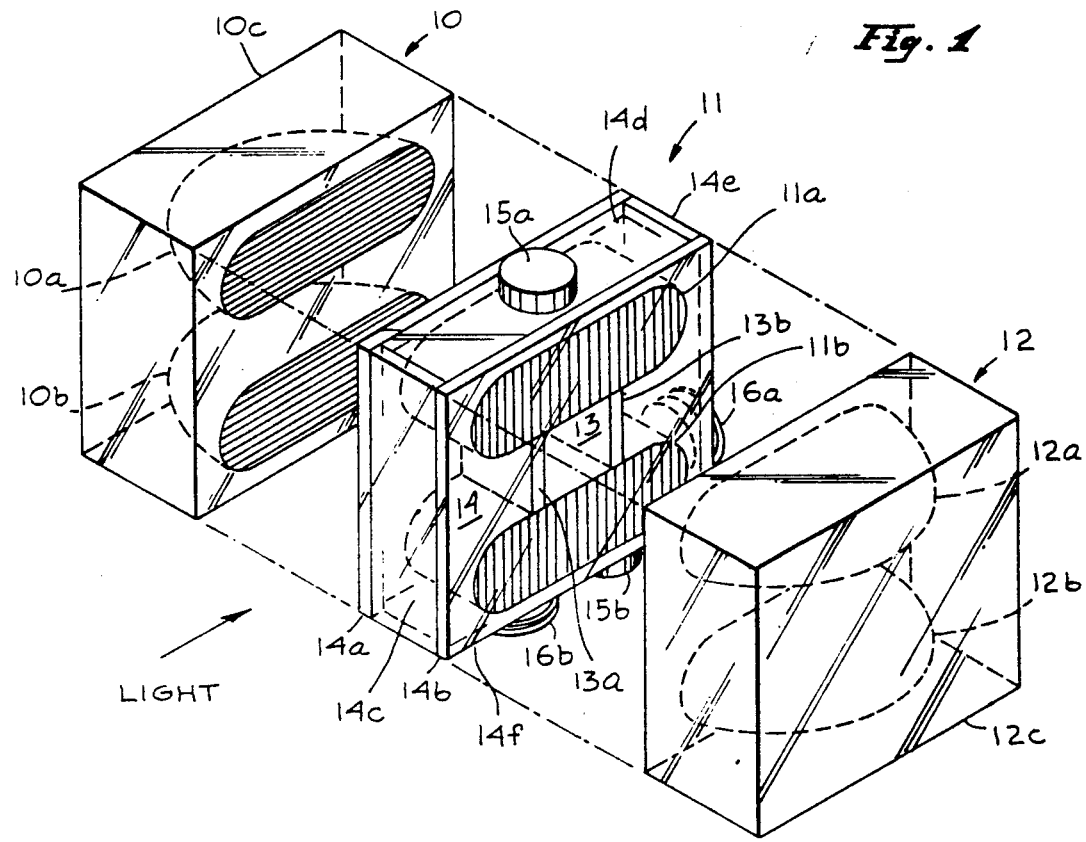
FIGURE 1 is a view in perspective of the three subassemblies in the first embodiment of the invention.

Referring now to the drawings and in particular to FIG. 1 therein, the first embodiment is shown to include three subassemblies that are generally designated 10, 11 and 12, the three subassemblies intentionally being separated and spaced from each other in order to more clearly illustrate and view the elements thereof. As may be seen from the figure, subassemblies 10 and 12 are identical and, therefore, each includes a pair of electrode sections embedded in a suitable material, such as a plastic, an example of a suitable plastic material being methyl methacrylate. The electrodes, which may be made of brass, are designated 10a and 10b in subassembly 10, and 12a and 12b in subassembly 12. The material in which these electrodes are embedded or encased is designated 10c in subassembly 10, 12c in subassembly 12, and is so shaped as to give these subassemblies a box-like appearance.

As for subassembly 11, this subassembly is positioned and mounted between the other two, and comprises an inner chamber 13 and an outer surrounding chamber 14. More specifically, center subassembly 11 also includes a pair of electrode sections 11a and 11b between which are mounted two optically flat quartz windows 13a and 13b cemented between two thin sheets of quartz 14a and 14b to form the chamber or container 13 for the Kerr liquid. It will be noted from the figure that quartz windows 13a and 13b are mounted parallel to each other and perpendicular to electrode sections 11a and 11b, which may also be made of quartz that has been gold plated. Furthermore, these windows are also perpendicular to subassembly walls 14a and 14b, with the result that chamber 13 formed by these several elements is also of a box-like structure. Outer chamber 14 is also formed by walls 14a and 14b together with four additional sides or walls 14c–14f cemented between walls 14a and 14b along the periphery thereof. It is in this outer chamber 14 into which electrode sections 11a and 11b extend that is injected the transparent liquid having a high dielectric strength, low dielectric constant, and low Kerr constant.

Mounted on wall 14d of subassembly 11 is a button-shaped electrode terminal 15a which passes or extends through this subassembly wall to mechanically and electrically couple with electrode 11a. Similarly, an electrode terminal 15b is mounted on and passes through subassembly wall 14f to mechanically and electrically couple with electrode 11b. Finally, subassembly 11 also includes a pair of bellows or diaphragms 16a and 16b, bellows 16a preferably being mounted on one of the side walls of the subassembly, such as side wall 14e, and being linked by means of a passageway or opening through that side wall to outer chamber 14, whereas bellows 16b is preferably mounted on another of the subassembly side walls, such as side wall 14f, and by means of a passageway that extends through electrode 11b, is linked or coupled with inner chamber 13. As will be more clearly shown by FIGS. 2a–2c, chambers 13 and 14 are filled with their respective liquids through these holes or passageways, and are sealed off by means of these bellows or diaphragms which are intended to take up and liquid expansion. The bellows or diaphragms may be made of a material such as Teflon.

Completing the constructional details of the FIG. 1 Kerr cell embodiment, the Kerr liquid may, for example, be nitrobenzene, whereas silicone oil or carbon disulphide are liquids that may be used in the outer chamber.

Figure 2A:
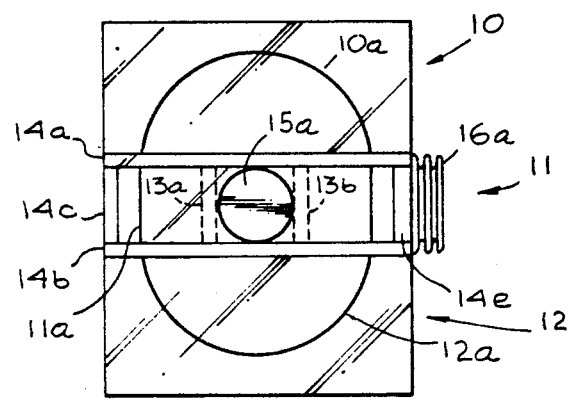
FIGS. 2a–2c are respectively top, front and end views of said FIG. 1 embodiment
Figure 2B:
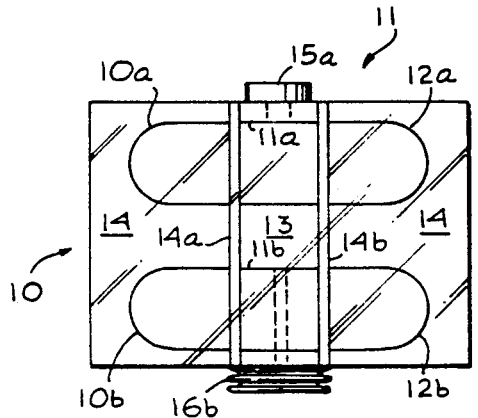
Figure 2C:
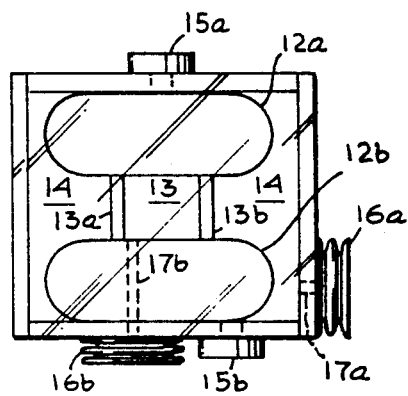

Top, front and end views of subassemblies 10–12, when they are assembled or joined together as they should be to form a compact unit, are respectively shown in FIGS. 2a–2c. The various elements previously described are clearly shown therein, as well as the two passageways, designated 17a and 17b, that respectively couple bellows 16a and 16b to chambers 14 and 13. With respect to some of these elements, it should be mentioned that optical windows 13a and 13b are preferably 1–2 millimeters thick and of high optical quality. It will also be recognized that walls 14c and 14e should be of similar thickness and also of high optical quality. As for side walls 14a and 14b, these need only be about 0.5 mm. thick and their optical quality need not be as high. Finally, it should be mentioned that the electrodes, when brought together as shown in the FIG. 2 views, have a pancake-type configuration with the sides rounded to reduce the possibility of electrical breakdown between them.

Considering its operation, the necessary high voltage is applied between electrode terminals 15a and 15b and when this is done, a strong electric field is established between the electrode formed by electrode sections 10a, 11a and 12a on the one hand and the electrode formed by electrode sections 10b, 11b and 12b on the other hand. The electric field will be quite uniform throughout chamber 13 because of its central location between the electrodes, but there will be some fringing of the electric field in the outer regions of chamber 14. However, because the liquid filling this outer chamber 14 is of a low Kerr constant, the effect on the light will, for all practical purposes, be nil. Thus, the only portions of the entire apparatus that will have any effect on the light are the structure and contents of chamber 13 and, as mentioned above, the electric field therein is perfectly uniform. It is thus seen that the present invention has made it possible to eliminate the errors caused by the inherent nature of prior Kerr cells.

A simpler and, therefore, preferred embodiment is shown in FIGS. 3a and 3b and, as shown therein, rather than being made up of three subassemblies, this embodiment is made up of a single assembly that employs most of the parts of a standard Kerr cell. More specifically, this embodiment includes an inner cell or chamber 20 made of quartz or fused silica plates cemented to each other and to electrodes 21a and 21b. The quartz or fused silica plates are respectively designated 20a–20d. As before, this inner chamber is filled with the Kerr liquid. Electrodes 21a and 21b extend for a relatively considerable distance beyond the walls of chamber 20, as may be seen from the figures, and they can be made of the same quartz material but plated with gold for electrical conductivity and chemical inertness. Surrounding chamber 20 and the electrodes is a second and outer chamber 22 formed by the walls designated 22a–22f. Again, as before, this outer chamber 22 is filled with a liquid having a low Kerr constant, high transparency and high dielectric strength, such as the silicone oil or carbon disulphide previously mentioned.

The FIG. 3 embodiment also includes a pair of electrode terminals 23a and 23b that are respectively linked electrically with electrodes 21a and 21b by means of a pair of electrode support columns 24a and 24b. The electrode support columns not only provide this electrical coupling but also, as their name implies, they provide the mechanical support for maintaining the electrodes fixedly in position. Terminals 23a and 23b respectively have openings 25a and 25b in them which are sealed or closed off by a pair of flexible diaphragms 26a and 26b. Finally, electrode support column 24a has a passageway 27a which opens on one end into outer chamber 22 and on the other end into terminal opening 25a, the liquid filling chamber 22 being fed to it by means of channels 25a and 27a. Once chamber 22, as well as channels 25a and 27a, have been filled with this liquid, diaphragm 26a is mounted over opening 25a to enclose it, while, at the same time, making allowances for thermal expansion of the liquid. Similarly, electrode support column 24b has a passageway 27b that at one end links or couples with terminal opening 25b and at the other end enters upon inner chamber 20 through an opening 21c in electrode 21b. As may be expected, the Kerr liquid is supplied to chamber 20 by means of channels 25b, 27b, and 21c, the mouth of terminal opening 25b ultimately being sealed by means of diaphragm 26b.

Although this second embodiment is of simpler construction than that first described, it will be recognized by those skilled in the art that the principles of operation are nevertheless the same. Accordingly, it is not repeated here in order to avoid being unduly redundant.

Although a couple of particular arrangements of the invention have been illustrated above by way of example, it is not intended that the invention be limited thereto. Accordingly, the invention should be considered to include any and all modifications, alterations or equivalent arrangements falling within the scope of the annexed claims. By way of example, it is entirely possible to substitute a solid, transparent, dielectric material that is non-birefringent when subjected to electric fields for the outer liquid surrounding chamber 13 in the first embodiment and chamber 20 in the second embodiment.

Having thus described the invention, what is claimed is:

1. A uniform-field Kerr cell apparatus comprising: a standard Kerr cell that includes a pair of spaced-apart electrodes and a chamber filled with a Kerr-cell fluid mounted centrally therebetween with the edges of the electrodes extending sufficiently far beyond the borders of said chamber so that the fringing of any electric field established between said electrodes also lies beyond said chamber borders; a second chamber whose walls are transparent enclosing said standard Kerr cell; a second transparent fluid that has high dielectric strength, a low dielectric constant, and a low Kerr constant filling said second chamber; and means for respectively supplying said chambers with said fluids from outside said second chamber.

2. The apparatus defined in claim 1, wherein said fluid-supply means includes first and second walls of said second chamber respectively having first and second holes therethrough; first and second electrode support columns respectively mounted between said first and second walls and said pair of electrodes, said first and second support columns respectively having first and second passages therethrough that respectively join with said first and second holes at one end thereof, said second passage entering into said second chamber at the other end thereof; and orifice means through one of said electrodes, one end of said orifice means entering upon said first chamber and the other end thereof joining with said first passage.

3. The apparatus defined in claim 2, wherein said fluid-supply means further includes first and second flexible members respectively mounted on said first and second electrode support columns and over said first and second passages to hermetically seal said fluids in their respective chambers and at the same time provide for their thermal expansion.

4. A uniform-field Kerr cell apparatus comprising: first, second and third subassemblies, each of said first and third subassemblies including spaced-apart outer electrode sections embedded in a rigid box-shaped material, said second subassembly being mounted between said first and third subassemblies and including a pair of inner spaced-apart electrode sections that, together with said outer electrode sections, form a pair of full-sized electrodes, said second subassembly further including a first transparent chamber centrally mounted between said inner electrode sections so that the fringing of any electric field established between said full-sized electrodes lies beyond the borders of said first chamber that is filled with a first transparent fluid that becomes birefringent upon the application of an electric field thereto, and a second transparent chamber enclosing said first chamber and said inner electrode sections that is filled with a second transparent fluid having high dielectric strength, a low dielectric constant, and a low Kerr constant; and means for respectively supplying said first and second chambers with said first and second fluids from outside said second chamber.

5. The apparatus defined in claim 4, wherein said means includes first and second walls of said second chamber respectively having first and second holes therethrough; first and second flexible members respectively mounted on said first and second walls over said first and second holes to hermetically seal said first and second fluids in their respective chambers and at the same time provide for their thermal expansion; and orifice means through one of said inner electrodes, one end of said orifice means entering upon said first chamber and the other end thereof joining with said first hole.

6. The apparatus defined in claim 5, wherein said first and second flexible members are bellows.

No references cited.

DAVID SCHONBERG, *Primary Examiner.*

P. R. MILLER, *Assistant Examiner.*